US012793327B2

(12) United States Patent
Sakata et al.

(10) Patent No.: US 12,793,327 B2
(45) Date of Patent: Nov. 10, 2026

(54) DISPLAY CONTROL DEVICE AND DISPLAY CONTROL METHOD

(71) Applicant: Faurecia Clarion Electronics Co., Ltd., Saitama (JP)

(72) Inventors: Naoto Sakata, Saitama (JP); Tetsuro Murakami, Saitama (JP); Masashi Koga, Saitama (JP)

(73) Assignee: FAURECIA CLARION ELECTRONICS CO., LTD., Saitama (JP)

( * ) Notice: Subject to any disclaimer, the term of this patent is extended or adjusted under 35 U.S.C. 154(b) by 0 days.

(21) Appl. No.: 18/528,532

(22) Filed: Dec. 4, 2023

(65) Prior Publication Data

US 2024/0203040 A1 Jun. 20, 2024

(30) Foreign Application Priority Data

Dec. 14, 2022 (JP) ................................ 2022-199052

(51) Int. Cl.

| | |
|---|---|
| ***G06T 15/20*** | (2011.01) |
| ***B60R 1/27*** | (2022.01) |
| ***G06F 3/01*** | (2006.01) |

(52) U.S. Cl.

CPC ................ *G06T 15/20* (2013.01); *B60R 1/27* (2022.01); *G06F 3/012* (2013.01); *G06F 3/013* (2013.01); *B60R 2300/105* (2013.01); *B60R 2300/20* (2013.01)

(58) Field of Classification Search

None

See application file for complete search history.

(56) References Cited

U.S. PATENT DOCUMENTS 11,630,302 B1 * 4/2023 Weiss ..................... B60K 35/10 345/7
2013/0027393 A1 1/2013 Fujiwara et al.
2014/0362195 A1 * 12/2014 Ng-Thow-Hing ..... G06V 40/20 348/51

(Continued)

FOREIGN PATENT DOCUMENTS

DE 102016106255 A1 10/2016
EP 2743133 A2 6/2014

(Continued)

OTHER PUBLICATIONS

German Search Report from corresponding Application No. 10 2023 133 664.9 mailed on Jul. 15, 2024, 18 pages with translation.

(Continued)

*Primary Examiner* — Andre L Matthews

(74) *Attorney, Agent, or Firm* — Tucker Ellis LLP

(57) ABSTRACT

A display control device includes an occupant information acquisition unit for acquiring information related to the angle of the face of an occupant; an image acquisition unit for acquiring an image in which a periphery of a vehicle is captured; an image conversion unit for converting the image to a virtual viewpoint image viewed from a virtual viewpoint; a virtual viewpoint setting unit for setting the position of the virtual viewpoint based on the amount of change in the face angle of the occupant; and a display processing unit for performing control to display the virtual viewpoint image on a display unit.

8 Claims, 7 Drawing Sheets

(56) References Cited

U.S. PATENT DOCUMENTS

| | | | | |
|---|---|---|---|---|
| 2016/0257199 | A1* | 9/2016 | Bark | B60K 37/20 |
| 2016/0297362 | A1 | 10/2016 | Tijerina et al. | |
| 2018/0328752 | A1* | 11/2018 | Tomatsu | G06T 19/006 |
| 2019/0130622 | A1* | 5/2019 | Hoover | G02B 27/0093 |
| 2019/0197327 | A1 | 6/2019 | Mangla et al. | |
| 2020/0103649 | A1* | 4/2020 | Higashiyama | G03B 21/142 |
| 2021/0223859 | A1* | 7/2021 | Sun | G06V 10/764 |
| 2021/0372810 | A1* | 12/2021 | Hato | G09G 5/38 |
| 2022/0185183 | A1 | 6/2022 | Kida et al. | |
| 2023/0298491 | A1* | 9/2023 | Feit | G09G 3/002 345/633 |
| 2024/0042857 | A1* | 2/2024 | Mimura | B60K 35/233 |
| 2024/0176154 | A1* | 5/2024 | Park | B60Q 1/085 |
| 2024/0187545 | A1* | 6/2024 | Nose | B60K 35/00 |

FOREIGN PATENT DOCUMENTS

| | | | |
|---|---|---|---|
| JP | 2014072604 | A | 4/2014 |
| JP | 2019018841 | A | 2/2019 |
| WO | 2022224754 | A1 | 10/2022 |

OTHER PUBLICATIONS

Office Action from corresponding Japanese Application No. 2022-199052, mailed on Jul. 28, 2026, 9 pages with translation.

* cited by examiner

DISPLAY CONTROL DEVICE AND DISPLAY CONTROL METHOD

CROSS-REFERENCE TO RELATED APPLICATION

The present application is based on and claims priority from Japanese patent application No. 2022-199052 filed on Dec. 14, 2022, the disclosure of which is hereby incorporated by reference in its entirety.

FIELD OF THE INVENTION

The present disclosure relates to a display control device and a display control method.

BACKGROUND

A vehicle display system disclosed in Patent Document 1 (WO 2022/224754) displays contents on a plurality of displays provided with non-display regions between reference display screens. An occupant status monitor is provided to detect the head position and angle of the vehicle occupant as well as line of sight of the occupant. A display processing unit displays important information on any of the plurality of display screens by processing the important information and prevent the information from being hidden under the condition that the important information is included in the contents to be displayed on the display based on a detection result of the occupant status monitor.

It is disclosed that with this conventional technology, a control unit detects the line of sight, head position and head angle of the occupant, and when the occupant moves the head position to the left or right, the image displayed on the display unit moves to the left or right, the image is reduced, or the image is tilted.

However, the above conventional technology requires the occupant to move their head significantly to change the image displayed on the display unit, which places a heavy burden on the occupant.

SUMMARY

Therefore, an object of the present disclosure is to provide a display control device and a display control method that can reduce the burden on an occupant when the occupant manipulates an image displayed on a display unit.

In order to achieve the aforementioned object, a display control device of the present disclosure includes: an occupant information acquisition unit for acquiring information related to the angle of the face of an occupant; an image acquisition unit for acquiring an image in which a periphery of a vehicle is captured; an image conversion unit for converting the image to a virtual viewpoint image viewed from a virtual viewpoint; a virtual viewpoint setting unit for setting the position of the virtual viewpoint based on the amount of change in the face angle of the occupant; and a display processing unit for performing control to display the virtual viewpoint image on a display unit.

A display control method executed by a control unit of a display control device provided in a vehicle includes: an occupant information acquisition step for acquiring information related to the angle of the face of an occupant; an image acquisition step for acquiring an image in which a periphery of the vehicle is captured; an image conversion step for converting the image to a virtual viewpoint image viewed from a virtual viewpoint; a virtual viewpoint setting step for setting the position of the virtual viewpoint based on the amount of change in the occupant face angle; and a display processing step for performing control to display the virtual viewpoint image on a display unit.

DETAILED DESCRIPTION

With respect to the use of plural and/or singular terms herein, those having skill in the art can translate from the plural to the singular and/or from the singular to the plural as is appropriate to the context and/or application. The various singular/plural permutations may be expressly set forth herein for sake of clarity.

Embodiment 1

Figure 1:
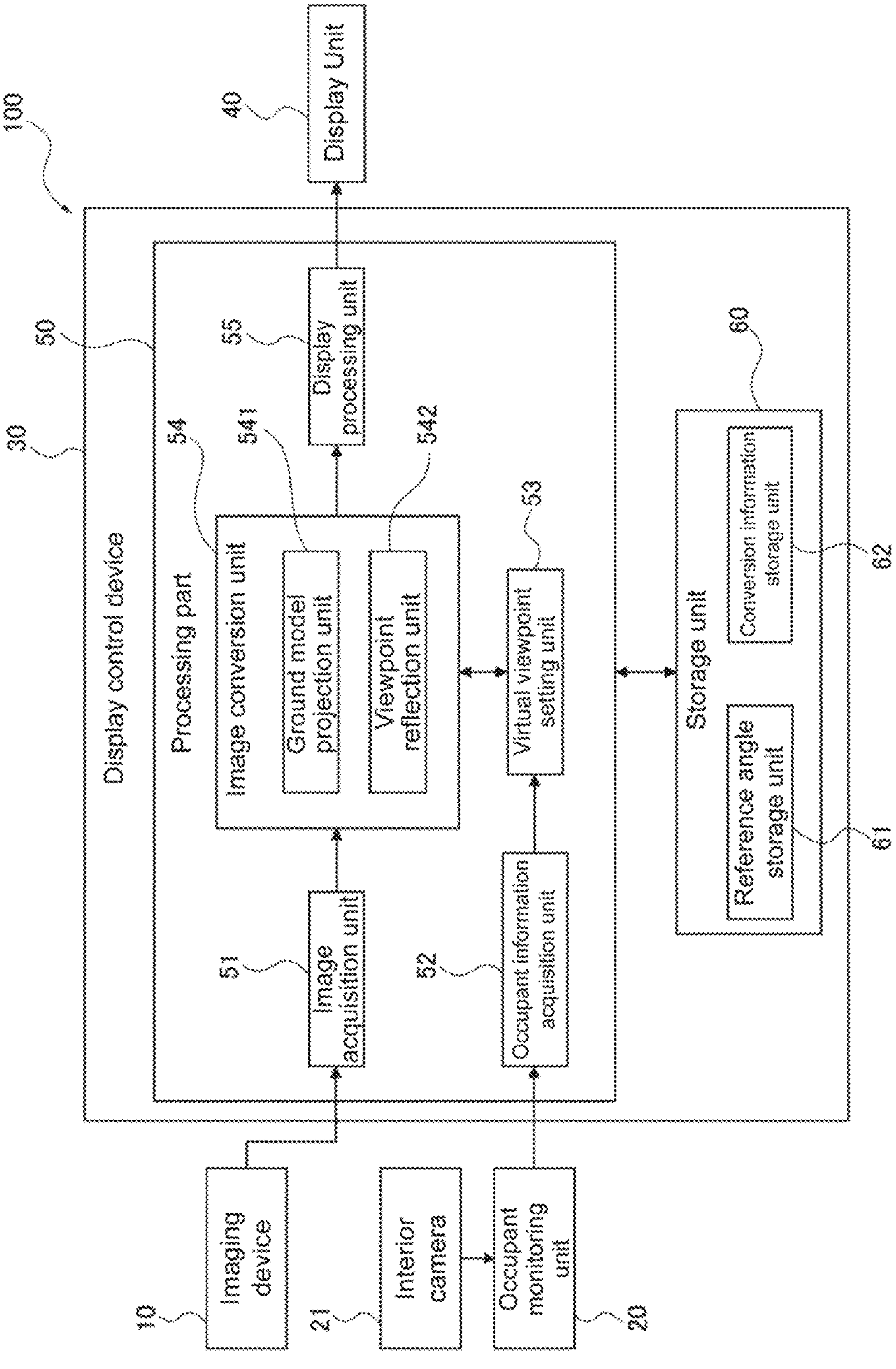
FIG. 1 is a functional block diagram depicting a schematic configuration of a display control system having a display control device according to Embodiment 1.

A display control device according to Embodiment 1 in the present disclosure will be described as follows based on the drawings. FIG. 1 is a functional block diagram depicting a schematic configuration of a display control system 100 having a display control device 30 according to Embodiment 1. The display control device 30 depicted in FIG. 1 is an embodiment of the display control device according to the present disclosure, but the present disclosure is not limited to the present embodiment. The display control device 30 is provided in a moving body such as an automobile or the like. Hereinafter, the moving body on which the display control device 30 of the present embodiment is provided will be referred to and described as own vehicle.

Figure 2:
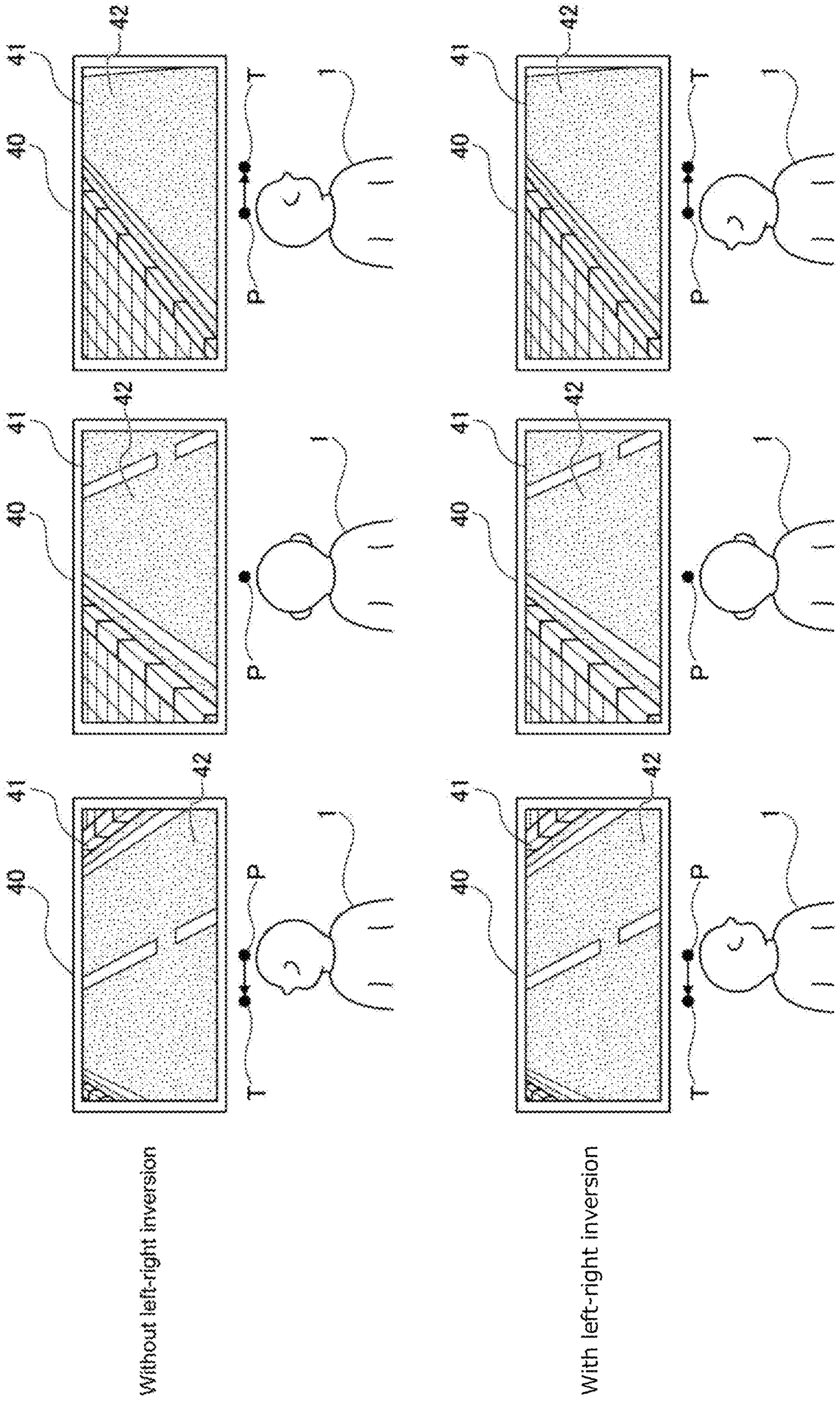
FIG. 2 is a diagram for describing the relationship between the face angle of an occupant and a display image displayed on a display unit.

The display control system 100 includes an imaging device 10, an occupant monitoring unit 20, the display control device 30, and a display unit 40. As depicted in FIG. 2, the display control system 100 generates a display image 42 to be displayed in a display region 41 of the display unit 40 in accordance with the amount of change in the face angle of a driver, who is the occupant 1, and then displays the image on the display unit 40. The center drawing in FIG. 2 depicts the display image 42 displayed on the display unit 40 when the face angle of the occupant 1 is at a reference angle described later, and the right and left drawings depict the display image 42 displayed on the display unit 40 when the face angle of the occupant 1 has changed from the reference angle. For example, FIG. 2 is an example of the display image 42 displayed on the display unit 40 when the face angle φ of the occupant 1 changes from the reference angle θ in a yaw direction. The face angle φ and reference angle θ will be described later. When converting the amount of change, which is the amount by which the face angle φ of occupant 1 has changed from the reference angle θ, to a virtual viewpoint position, the positive and negative of the amount of change may be inverted as depicted in the lower level "with left-right inversion" in FIG. 2. For example, the center of projection corresponds to the virtual viewpoint when the display region of the display unit 40 is set to a projection surface and the image projected from the center of projection onto the projection surface. As discussed in detail later, the virtual viewpoint in the present disclosure does not necessarily correspond to the position of an eye of the driver. The display control system 100 can display an image as if looking outside the vehicle through the display unit 40 from the virtual viewpoint.

The imaging device 10 is installed outside the own vehicle and captures an image of the surroundings of the vehicle. The imaging device 10 outputs the captured image to the display control device 30 as captured image data in accordance with a prescribed protocol. The imaging device 10 includes a front camera installed in the front of the own vehicle in the present embodiment. Note that the imaging device 10 is not limited to the front camera, but can also include a rear camera installed in the back of the own vehicle, side cameras installed in the front and back of the own vehicle on left and right sides, and side cameras installed in the front and back of the own vehicle on left and right sides, and the like.

The occupant monitoring unit 20 is provided in the own vehicle. The occupant monitoring unit 20 monitors the status of the driver, who is the occupant 1, based on an image captured by an in-vehicle camera 21. The occupant monitoring unit 20 can be any known type of monitoring unit. The in-vehicle camera 21 is a camera that captures an image of the interior of the own vehicle, including the driver, and is installed toward the vehicle interior in the vicinity of the display unit 40, for example. Furthermore, the occupant monitoring unit 20 detects the face angle of the occupant 1 using a known technique based on the image captured by the in-vehicle camera 21, and outputs information related to the acquired face angle (hereinafter referred to as "angle information") to the display control device 30. In the present embodiment, the occupant monitoring unit 20 outputs the yaw angle and pitch angle, which indicate the direction in which the face of the occupant 1 is facing in a horizontal direction and vertical direction, as the face angle information.

The display control device 30 is an information processing device that executes a process related to the creation and display of an image, and includes a processing unit (control unit) 50 and a storage unit 60, as depicted in FIG. 1. The display control device 30 is configured of, for example, an ECU having a CPU, GPU, RAM, and ROM or other storage device. The processing unit 50 is primarily configured of a CPU or the like included in the ECU, and controls an overall operation of the display control device 30 by deploying a prescribed program stored in ROM to RAM and executing the program. The storage unit 60 is primarily configured of the storage device included in the ECU but can include an externally provided server or database. Note that the display control device 30 can be configured of a single ECU, or can be configured of a plurality of ECUs, distributing each function of the processing unit 50 described later, or distributing the data to be stored. Furthermore, a part or all of the functions of the display control device 30 can be implemented using hardware such as FPGA, ASIC, or the like. Furthermore, a single ECU can be configured to have not only a function of the display control device 30, but also the functions of a camera ECU that controls the imaging device 10 and the occupant monitoring unit 20.

The processing unit 50 controls the entire display control device 30 and generates a display image to be displayed on the display unit 40 based on the captured image data input from the imaging device 10 and the angle information input from the occupant monitoring unit 20. To enable this, the processing unit 50 functions as an image acquisition unit 51, occupant information acquisition unit 52, virtual viewpoint setting unit 53, image conversion unit 54, and display processing unit 55, as depicted in FIG. 1, but is not limited to this configuration.

The image acquisition unit 51 acquires captured image data of the periphery of the own vehicle from the imaging device 10 and outputs the data to the image conversion unit 54.

The occupant information acquisition unit 52 acquires angle information from the occupant monitoring unit 20 and calculates the amount of change in the face angle, in other words, yaw angle and pitch angle, based on the acquired angle information and information related to a face angle serving as a predetermined reference (hereinafter referred to as "reference angle information"). The occupant information acquisition unit 52 outputs the amount of change in the calculated yaw angle and pitch angle to the virtual viewpoint setting unit 53.

The reference angle information is stored in advance in a reference angle storage unit 61 of the storage unit 60. For example, the reference angle information can be information related to the face angle when the reference angle is the direction of the face when the occupant 1 faces forward (front surface). For example, the face angle when occupant 1 faces the display unit 40 may be the reference angle. The angle information acquired from the occupant monitoring unit 20 is information related to the face angle after the occupant 1 has changed the direction of the face relative to the reference angle.

Figure 3:
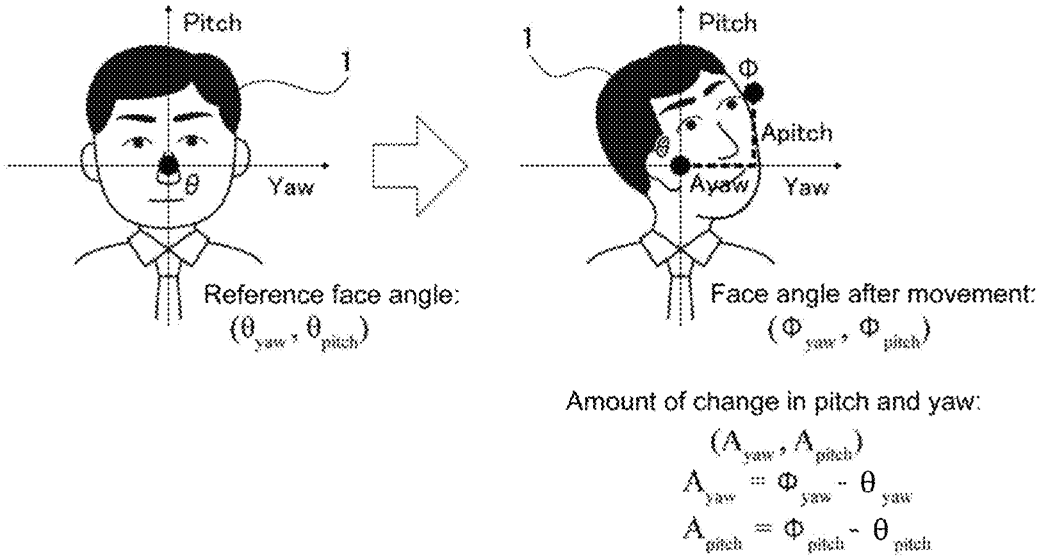
FIG. 3 is a diagram for describing a calculation procedure for the amount of change in the yaw angle and pitch angle executed in an occupant information acquisition unit.

A calculation procedure of the amount of change in the yaw angle and pitch angle by the occupant information acquisition unit 52 is described below with reference to FIG. 3. The yaw angle (yaw) is the face angle in the horizontal direction (left-right direction) of the occupant 1, and the pitch angle (pitch) is the face angle in the vertical direction (up-down direction) of the occupant 1. With the reference angle as θ ($\theta_{yaw}$, $\theta_{pitch}$) and the face angle acquired from the DMS 20 (i.e., the face angle after the face direction has changed) as φ ($\varphi_{yaw}$, $\varphi_{pitch}$), the occupant information acquisition unit 52 calculates the amount of change A ($A_{yaw}$, $A_{pitch}$) in the face angle using the following equations (1) and (2). In the following equations (1) and (2), $\theta_{yaw}$ and $\theta_{pitch}$ represent the yaw angle and pitch angle as reference angles, $\varphi_{yaw}$ and $\varphi_{pitch}$ represent the yaw angle and pitch angle as the face angle after movement, and $A_{yaw}$ and $A_{pitch}$ represent the amount of change in the yaw angle and the amount of change in the pitch angle.

$$A_{yaw} = \varphi_{yaw} - \theta_{yaw} \quad (1)$$

-continued $$A_{pitch} = \varphi_{pitch} - \theta_{pitch} \quad (2)$$

The virtual viewpoint setting unit 53 calculates (sets) the position of the virtual viewpoint (hereinafter referred to as "virtual viewpoint position T") of the occupant 1 in the horizontal direction and vertical direction based on the amount of change in the yaw angle and pitch angle ($A_{yaw}$, $A_{pitch}$) input from the occupant information acquisition unit 52. The virtual viewpoint setting unit 53 outputs the calculated virtual viewpoint position to the image conversion unit 54.

Figure 4:
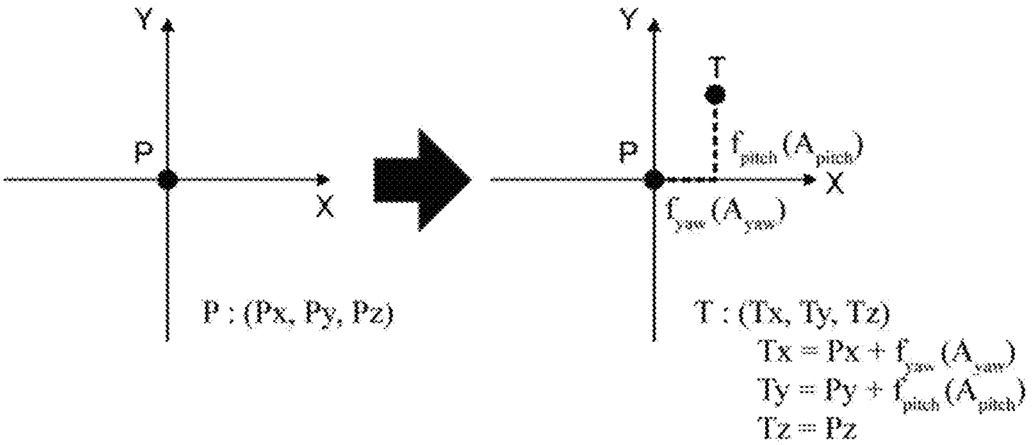
FIG. 4 is a diagram for describing a calculation procedure of a virtual viewpoint position executed in a virtual viewpoint setting unit

The calculation procedure of the virtual viewpoint position T by the virtual viewpoint setting unit 53 is described below with reference to FIG. 4. P in FIG. 4 represents the virtual viewpoint position when the face angle of the occupant 1 is the reference angle θ, and T represents the virtual viewpoint position when the face angle of the occupant changes from the reference angle θ to the angle φ. With the coordinates of the virtual viewpoint position P as P(Px, Py, Pz) and the coordinates of the virtual viewpoint position T as T(Tx, Ty, Tz), the virtual viewpoint setting unit 53 calculates the coordinates of the virtual viewpoint position T using the following equations (3), (4) and (5). In equations (3) and (4) below, $f_{yaw}$ and $f_{pitch}$ represent prescribed increasing functions. The increasing functions can be any known type of increasing function. The increasing functions may involve a constant increase in the value of the virtual viewpoint position T by adding a prescribed additional value according to the amount of change in the face angle. For example, the increasing function may increase the value of the virtual viewpoint position T by changing the additional value according to the degree of change, such as increasing the additive value as the amount of change in the face angle increases, and the like. Note that the virtual viewpoint setting unit 53 may set the virtual viewpoint position T by inverting the amount of change in the face angle of the occupant 1 in the up-down direction (pitch direction) and left-right direction (yaw direction).

$$Tx = Px + f_{yaw}(A_{yaw}) \quad (3)$$

$$Ty = Py + f_{pitch}(A_{pitch}) \quad (4)$$

$$Tz = Pz \quad (5)$$

The image conversion unit 54 generates the display image 42 (image of the captured image 70 viewed from the virtual viewpoint) to be displayed in the display region 41 of the display unit 40 based on the captured image 70 captured by the imaging device 10 and the virtual viewpoint position T calculated by the virtual viewpoint setting unit 53. Therefore, the image conversion unit 54 executes: a first conversion process for converting the coordinates of the captured image 70 from an image coordinate system of the captured image 70 to the coordinates of a vehicle coordinate system, which is the coordinate system of the own vehicle; and a second conversion process for converting the coordinates of the vehicle coordinate system to a display coordinate system, which is the coordinate system of the display unit 40.

The image conversion unit 54 has a ground model projection unit 541 and a viewpoint reflection unit 542, as depicted in FIG. 1. The ground model projection unit 541 performs a correction process and a ground model image generation process, which is the first conversion process. Furthermore, the ground model projection unit 541 performs a calculation process for a projection conversion matrix M used in the first conversion process. The ground model projection unit 541 stores the calculated projection conversion matrix M in the conversion information storage unit 62 of the storage unit 60.

The ground model projection unit 541 corrects lens distortion (e.g., lens distortion aberration, chromatic aberration, and the like) of the imaging device 10 using known techniques with respect to the captured image 70 input from the image acquisition unit 51 as the correction process. Note that the correction process can be performed by the image acquisition unit 51 instead of the ground model projection unit 541, and the image acquisition unit 51 can be configured to output the captured image 70 after the lens distortion correction process to the ground model projection unit 541.

The ground model projection unit 541 converts the image coordinate system to the vehicle coordinate system such that the captured image 70 after the correction process is mapped and projected onto a plane set in the vehicle coordinate system for display, as the ground model image generation process, to generate a ground model image 72. The ground model image generation process is the first conversion process that converts the image coordinate system to the vehicle coordinate system using the projection conversion matrix M stored in the conversion information storage unit 62.

Figure 5:
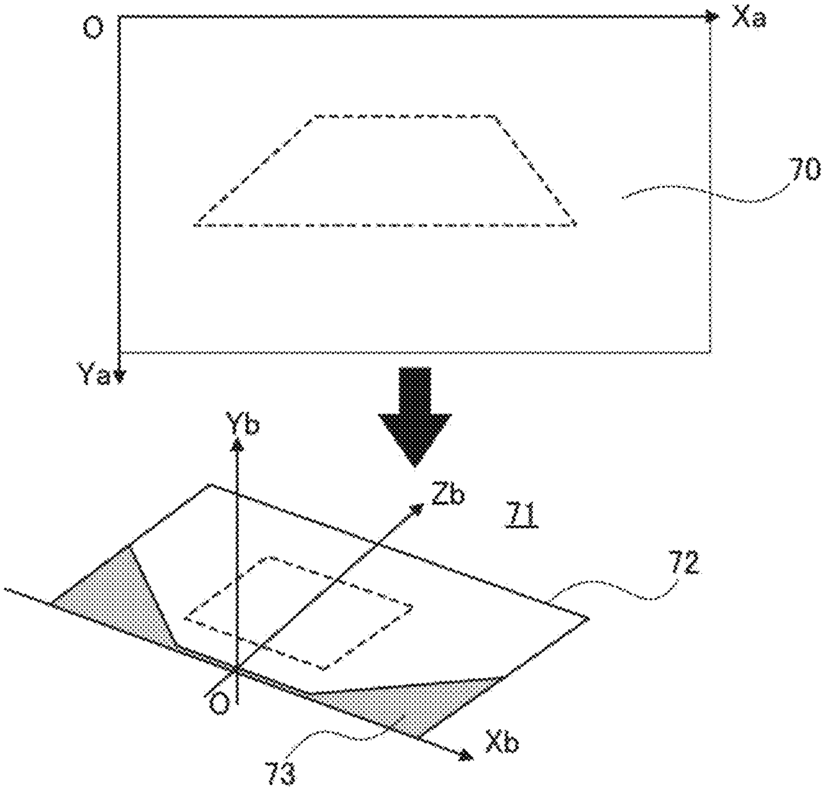
FIG. 5 is a diagram for describing a first conversion process executed in a ground model projection unit.

The ground model image generation process is described below with reference to FIG. 5. The upper drawing in FIG. 5 is the image coordinate system based on the captured image 70 after the correction process, and the lower drawing in FIG. 5 is the vehicle coordinate system based on the own vehicle. The image coordinate system is a two-dimensional coordinate system with the origin O (0, 0) at the upper left corner of the captured image 70 after the correction process. Xa and Ya are mutually orthogonal axes, and the unit of each axis is a pixel (px). The vehicle coordinate system is a three-dimensional coordinate system with the origin O (0, 0, 0) at a prescribed position of the own vehicle. Xb is an axis extending in a vehicle width direction (horizontal direction), Yb is an axis orthogonal to Xb and extending in the up-down direction (vertical direction) of the vehicle, and Zb is an axis orthogonal to Xb and Yb and extending in a front direction of the vehicle. The units for the Xb, Yb, and Zb axes are mm.

The plane set in the vehicle coordinate system is set to a plane corresponding to the ground (traveling surface) on which the own vehicle travels. In the present embodiment, the plane is referred to as a ground model 71. Furthermore, the region indicated by code 72 in FIG. 5 represents an image in which the captured image 70 is mapped onto the ground model 71 by the ground model image generation process (hereinafter referred to as "ground model image 72"). Furthermore, the region indicated by code 73 in FIG. 5 is a region where the captured image 70 is not mapped, in other words, not captured by the imaging device 10 (hereinafter referred to as "non-mapped region 73").

The ground model projection unit 541 substitutes the coordinates of each pixel in the captured image 70 after the correction process into the coordinates of the ground model 71 in the following equation (6). In equation (6) below, $x_a$ and $y_a$ represent the x and y coordinates of the image coordinate system, and $x_b$ and $z_b$ represent the x and z coordinates of the vehicle coordinate system. Herein, a is the homogeneous coordinates representing coordinates ($x_a$, $y_a$) in the image coordinate system, and b is the homogeneous coordinates representing coordinates ($x_b$, $z_b$) in the vehicle coordinate system. The relationship between the homogeneous coordinates a and b is expressed by the following equation (6). Note that value $\lambda_b$ indicates the magnification at the homogeneous coordinate b. Regardless of the value of $\lambda_b$ (except for the value 0), the same homogeneous coordinate b represents the same coordinate in the vehicle coordinate system.

[Equation 1]

$$\begin{pmatrix} \lambda_b x_b \\ \lambda_b z_b \\ \lambda_b \end{pmatrix} = M \begin{pmatrix} x_a \\ y_a \\ 1 \end{pmatrix} \tag{6}$$

Figure 7:
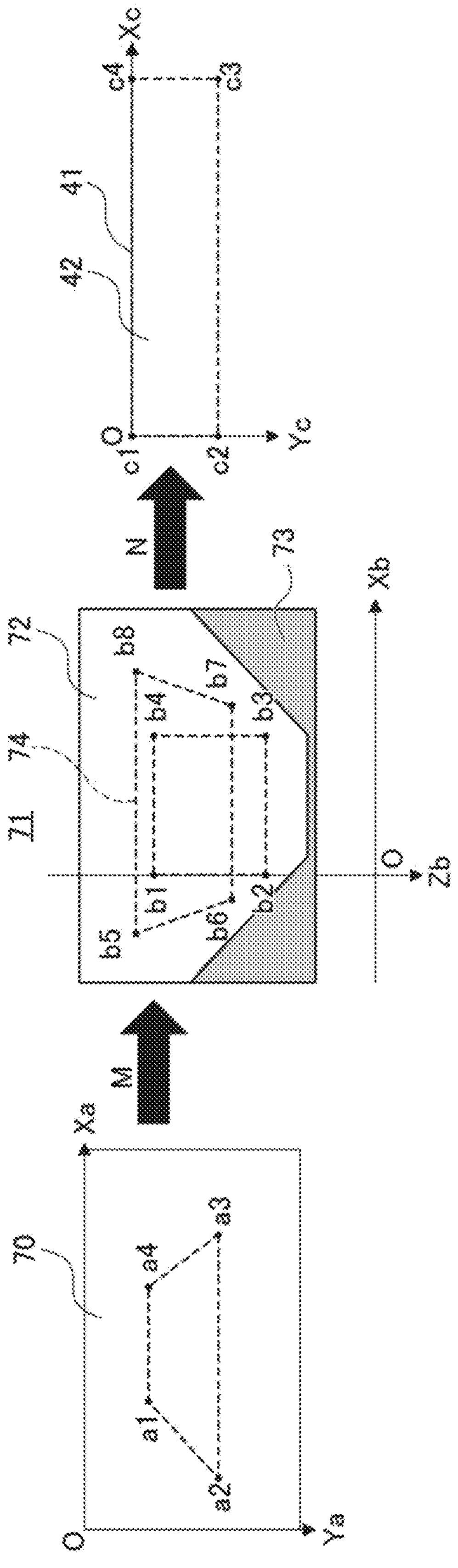
FIG. 7 is a diagram for describing the first conversion process executed in the ground model projection unit and a second conversion process executed in the viewpoint reflection unit.

The projection conversion matrix M is calculated in advance, and the calculation procedure can be performed as follows with reference to the left and center drawings in FIG. 7. a1, a2, a3, and a4 in FIG. 7 are reference points to be referenced in the captured image 70 in the image coordinate system. Furthermore, b1, b2, b3, and b4 in FIG. 7 are reference points in the ground model 71 in the vehicle coordinate system corresponding to the reference points a1, a2, a3, and a4 in the above image coordinate system. The relationship between the homogeneous coordinates a representing coordinates ($x_a$, $y_a$) in the image coordinate system, and the homogeneous coordinates b representing coordinates ($x_b$, $z_b$) in the vehicle coordinate system can be expressed by the above equation (6).

The ground model projection unit 541 sets the four reference points b1, b2, b3, and b4 in the vehicle coordinate system, which are points captured on the captured image 70 after the correction process. Furthermore, the coordinates of each of the reference point b1, b2, b3, and b4 are identified by actual measurement and input to the ground model projection unit 541. Next, the ground model projection unit 541 identifies the coordinates of the four reference points a1, a2, a3, and a4 in the image coordinate system of the captured image 70 after the correction process.

The ground model projection unit 541 calculates the projection conversion matrix M by substituting the coordinates of each reference point identified above into the above equation (6) and solving a simultaneous equation involving each element of the projection conversion matrix M. The ground model projection unit 541 stores the calculated projection conversion matrix M in the conversion information storage unit 62 of the storage unit 60.

Figure 6:
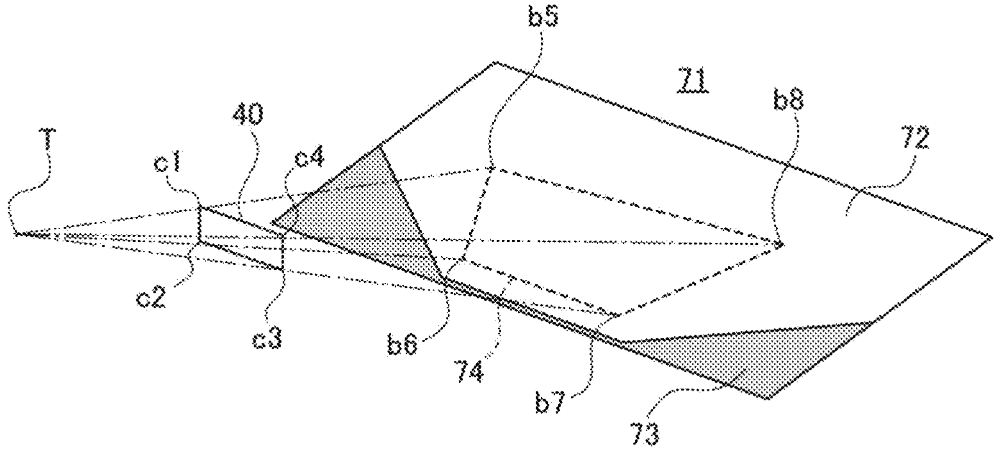
FIG. 6 is a diagram for describing a projection region setting process executed in a viewpoint reflection unit.

The viewpoint reflection unit 542 performs a projection region setting process, a calculation process of a projection conversion matrix N, and a display image generation process, which is the second conversion process. The projection region setting process is described below with reference to FIG. 6. As depicted in FIG. 6, with the virtual viewpoint position T input from the virtual viewpoint setting unit 53 as a reference and the projection surface as the display unit 40, the viewpoint reflection unit 542 calculates the region on the ground model 71 (projection region 74) projected from the virtual viewpoint position T onto the display region 41 of the display unit 40. A region surrounded by points c1, c2, c3, and c4 in FIG. 6 is the display region 41 of the display unit 40, and a region surrounded by points b5, b6, b7, and b8 on the ground model 71 is the projection region 74 projected onto the display region 41. The viewpoint reflection unit 542 calculates the coordinates of points b5 to b8 based on the coordinates of the virtual viewpoint position T and the coordinates of points c1 to c4.

More specifically, the viewpoint reflection unit 542 uses the coordinates T (Tx, Ty, Tz) of the virtual viewpoint position T and the coordinates of points c1 to c4 at the four corners of the display region 41 to set straight lines connecting the virtual viewpoint position T and points c1 to c4, respectively. Next, the viewpoint reflection unit 542 detects the intersections b5 to b8 of these lines with the ground model 71, identifies the region surrounded by the intersections b5 to b8 as the projection region 74 corresponding to the display region 41, and calculates the coordinates of each intersection b5 to b8.

The calculation process of the projection conversion matrix N is described below, with reference to the center and right-hand drawings in FIG. 7. The right-hand drawing in FIG. 7 is a display coordinate system based on the display region 41 of the display unit 40. The display coordinate system is a two-dimensional coordinate system with the origin O (0, 0) at the upper left corner of the display region 41. Xc and Yc are mutually orthogonal axes, and the unit of each axis is a pixel (px).

On the ground model 71 in the vehicle coordinate system, the region surrounded by the intersections b5, b6, b7, and b8 is the projection region 74 calculated by the viewpoint reflection unit 542, and b is the same homogeneous coordinate representing the coordinates ($x_b$, $z_b$) in the vehicle coordinate system. c1, c2, c3, and c4 are the reference points corresponding to each intersection point b5, b6, b7, and b8 in the display coordinate system of the display unit 40, and c is the homogeneous coordinate representing the coordinates ($x_c$, $y_c$) of the display coordinate system. The relationship between the homogeneous coordinates b and c is expressed by the following equation (7). Note that value $\lambda_c$ indicates the magnification at the homogeneous coordinate c. Regardless of the value of $\lambda_c$ (except for the value 0), the same homogeneous coordinate c represents the same coordinate in the display coordinate system.

[Equation 2]

$$\begin{pmatrix} \lambda_c x_c \\ \lambda_c z_c \\ \lambda_c \end{pmatrix} = N \begin{pmatrix} \lambda_b x_b \\ \lambda_b z_b \\ \lambda_b \end{pmatrix} \tag{7}$$

The viewpoint reflection unit 542 calculates the projection conversion matrix N by substituting the coordinates of the reference points c1 to c4 of the display coordinate system of the display unit 40 and the coordinates of the intersections b5 to b8 of the vehicle coordinate system, calculated in the projection region setting process, into the above equation (7) and solving a simultaneous equation involving each element of the projection conversion matrix N. The viewpoint reflection unit 542 stores the calculated projection conversion matrix N in the conversion information storage unit 62 of the storage unit 60.

Furthermore, as the display image generation process, the viewpoint reflection unit 542 converts the coordinates of the projection region 74 into the display coordinate system by substituting the coordinates of each point of the projection region 74 of the ground model image 72 corresponding to each pixel of the display region 41 of the display unit 40 into the above equation (7), using the projection conversion matrix N calculated in the above calculation process. Thereby, the viewpoint reflection unit 542 generates image data for the display image 42 corresponding to the image of the projection region 74 on the ground model image 72. The viewpoint reflection unit 542 outputs the generated image data to the display processing unit 55.

Based on the image data input from the viewpoint reflection unit 542, the display processing unit 55 displays the display image 42 corresponding to the image data on the display region 41 of the display unit 40.

The storage unit 60 temporarily or non-temporarily stores a control program for operating the display control device 30 and various data and parameters used in various operations in the processing unit 50. Furthermore, as described above, the reference angle storage unit 61 of the storage unit 60 temporarily or non-temporarily stores the reference angle information of the face when the face angle is the reference angle. The conversion information storage unit 62 of the storage unit 60 temporarily or non-temporarily stores the projection conversion matrix M and the projection conversion matrix N used in the ground model image generation process (first conversion process) and the display image generation process (second conversion process), respectively.

Figure 8:
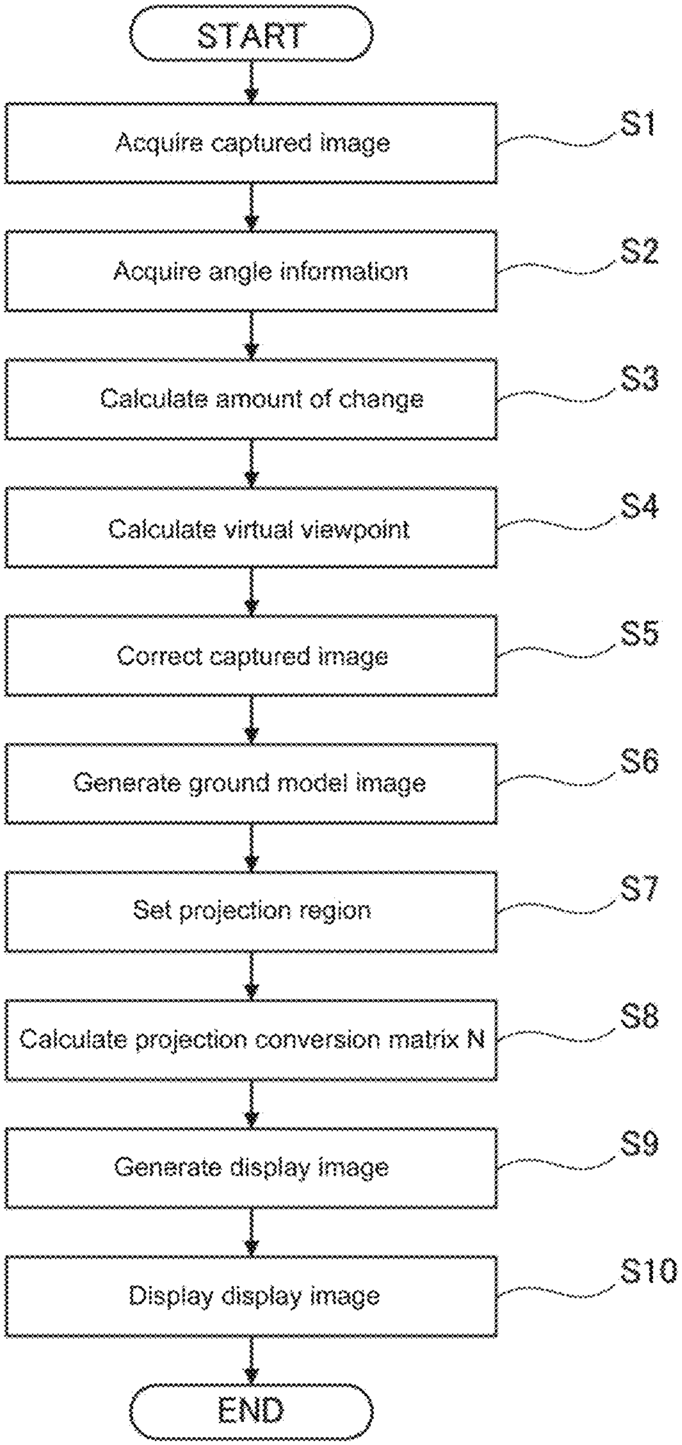
FIG. 8 is a flowchart for describing an example of an operation of the display control device according to Embodiment 1.

An example of an operation of the display control system 100 according to Embodiment 1 with the configuration described above is described below, with reference to the flowchart in FIG. 8. FIG. 8 depicts an example of the operation of the display control device 30, but the operation of the display control device 30 is not limited to the operation in FIG. 8.

First, in step S1, the image acquisition unit 51 acquires the captured image 70 captured by the imaging device 10 and outputs the image to the image conversion unit 54. In step S2, the occupant information acquisition unit 52 acquires angle information related to the face angle of the occupant 1 from the occupant monitoring unit 20. In the subsequent step S3, the occupant information acquisition unit 52 calculates the amount of change in the face angle using the aforementioned equations (1) and (2) based on the acquired angle information and the reference angle information acquired from the reference angle storage unit 61, and outputs the amount of change to the virtual viewpoint setting unit 53.

In the subsequent step S4, the virtual viewpoint setting unit 53 calculates the virtual viewpoint position T of the occupant 1 using the aforementioned equations (3) and (4) based on the amount of change input from the occupant information acquisition unit 52, and outputs the position to the image conversion unit 54.

In the subsequent step S5, the ground model projection unit 541 performs the correction process to correct lens distortion with respect to the captured image 70. Next, in the subsequent step S6, the ground model projection unit 541 generates a ground model image 72 by converting the coordinates of the captured image 70 after the correction process to the coordinates of the vehicle coordinate system using the projection conversion matrix M acquired from the conversion information storage unit 62 and the aforementioned equation (6).

In the subsequent step S7, the viewpoint reflection unit 542 calculates a region on the ground model image 72 (projection region 74) to be projected onto the display region 41 of the display unit 40 based on the virtual viewpoint position T input from the virtual viewpoint setting unit 53. In other words, the viewpoint reflection unit 542 calculates the coordinates of the intersections b5 to b8 surrounding the projection region 74 based on the coordinates of the virtual viewpoint position T and the coordinates of points c1 to c4 at the four corners of the display region. Next, in step S8, the viewpoint reflection unit 542 calculates the projection conversion matrix N by substituting the coordinates of points c1 to c4 in the display coordinate system and the coordinates of the intersections b5 to b8 in the vehicle coordinate system into the aforementioned equation (7).

In the subsequent step S9, the viewpoint reflection unit 542 substitutes each coordinate of the projection region 74 into the aforementioned equation (7) and converts the coordinates to coordinates of the display coordinate system, thereby generating image data of the display image 42 to be displayed in the display region 41 and outputting the data to the display processing unit 55.

Furthermore, in step S10, based on the image data input from the viewpoint reflection unit 542, the display processing unit 55 displays the display image 42 corresponding to the image data on the display region 41 of the display unit 40. As depicted in FIG. 2, the display region 41 displays the display image 42 in a direction corresponding to the face angle of the occupant 1.

As described above, the display control device 30 of the present embodiment converts the captured image 70 in which a periphery of the vehicle is captured into the ground model image 72 based on the virtual viewpoint position T set based on the amount of change in the face angle of the occupant 1, and converts the ground model image 72 into the display image 42 to be displayed on the display unit 40. Furthermore, the display image 42 is then displayed on the display unit 40, such that the occupant 1 can see the display image 42 according to the face angle. The display image 42 has an appropriate connection with scenery viewed through a front window, and the occupant 1 can view the display image 42 without feeling out of place. Moreover, when the occupant 1 wants to change the image displayed on the display unit 40, the occupant need not move their head significantly, but need only move the face angle up, down, left, or right. Therefore, the display control device 30 in the present embodiment can reduce the burden on the occupant 1 when the occupant 1 changes the image displayed on the display unit 40.

Furthermore, the display control device 30 of the present embodiment has a storage unit 60 (reference angle storage unit 61) that stores a reference angle, which is a prescribed face angle of the occupant 1. Furthermore, the virtual viewpoint setting unit 53 sets the position T of the virtual viewpoint based on the amount of change in the face angle of the occupant 1 with respect to the reference angle. Thereby, the virtual viewpoint setting unit 53 can acquire the amount of change in the face angle with higher precision. As a result, the display control device 30 can present a more appropriate display image 42 to the occupant 1 according to the face angle.

Furthermore, in the display control device 30 of the present embodiment, the occupant information acquisition unit 52 acquires the yaw angle and pitch angle as the face angle of the occupant 1. Furthermore, the virtual viewpoint setting unit 53 moves the position T of the virtual viewpoint in the horizontal direction based on the amount of change in yaw angle, and moves the position T of the virtual viewpoint in the vertical direction based on the amount of change in pitch angle. This configuration allows the virtual viewpoint setting unit 53 to calculate the amount of change in the face angle with higher precision and speed, and thus the display control device 30 can perform display control processing with higher efficiency and precision.

An embodiment of the present disclosure has been described in detail with reference to the drawings, but the specific configuration is not limited to this embodiment and design changes to a degree that do not deviate from the gist of the present disclosure are included in the present disclosure.

For example, the display control device 30 can be configured with a viewpoint position acquisition unit for acquiring information related to the position of an eye of the occupant 1. Based on the information related to the eye position acquired by the viewpoint position acquisition unit, the virtual viewpoint setting unit 53 sets the virtual viewpoint at a position corresponding to the eye position of the occupant when the face angle of the occupant 1 is the reference angle, and when the face angle of the occupant 1 is not the reference angle, moves the virtual viewpoint from the eye position of the occupant 1 to a position based on the amount of change. This configuration allows the virtual viewpoint setting unit 53 to set the position of the virtual viewpoint according to the eye position of the occupant 1, making the position of the virtual viewpoint more appropriate and simpler to set. For example, if the face angle when occupant 1 faces the display unit 40 is the reference angle, the virtual viewpoint can be set at a position corresponding to the eye position of occupant 1 while the face of the occupant 1 is facing the display unit 40. Furthermore, when the face of the occupant 1 is not facing the display unit 40, a virtual viewpoint can be set at a position based on the amount of change in the face angle of the occupant 1.

Furthermore, the display control device 30 of the above embodiment uses the face angle when the face of the occupant 1 is at the reference angle as the reference angle (reference angle information), but the present disclosure invention is not limited thereto. For example, the reference angle can be the face angle information from the last time the face angle was acquired. In this case, the occupant information acquisition unit 52 updates the reference angle information in the reference angle storage unit 61 each time the face angle is acquired. This configuration allows the display control device 30 to calculate the amount of change when the occupant 1 changes the face angle for the current time, based on the face angle before the occupant 1 changes the face angle.

What is claimed is:

1. A display control device for a vehicle, the display control device being configured to change a display image displayed on a display unit by a change in an angle of a face of an occupant of the vehicle and comprising:

an occupant monitoring unit for outputting a yaw angle and a pitch angle indicating a direction in which the face of the occupant of the vehicle is facing in a horizontal direction and a vertical direction as information related to the angle of the face, wherein the yaw angle is the angle of the face of the occupant in the horizontal direction and the pitch angle is the angle of the face of the occupant in the vertical direction;

an occupant information acquisition unit for acquiring information related to the angle of the face of the occupant of the vehicle;

an image acquisition unit for acquiring a captured image in which a periphery of the vehicle is captured;

an image conversion unit for converting the captured image in which the periphery of the vehicle is captured by the image acquisition unit to the display image;

a virtual viewpoint setting unit for setting the position of a virtual viewpoint based on an amount of change in the angle of the face of the occupant, the virtual viewpoint corresponding to a center of projection when a display region of the display unit is set to a projection surface;

a display processing unit for performing control to display the display image on the display unit; and a storage unit for storing a reference angle in which the angle of the face of the occupant is a prescribed angle, wherein the occupant information acquisition unit is configured to:

acquire the angle of the face after the direction of the face has changed from the occupant monitoring unit, and acquire the reference angle from the storage unit;

calculate an amount of change in the yaw angle by subtracting the yaw angle as the reference angle from the yaw angle as the angle of the face after movement; and calculate an amount of change in the pitch angle by subtracting the pitch angle as the reference angle from the pitch angle as the angle of the face after movement, wherein the virtual viewpoint setting unit is configured to:

set the position of the virtual viewpoint of the occupant in the horizontal direction by adding a value corresponding to the amount of change in the yaw angle to a position in the horizontal direction corresponding to the reference angle; and set the position of the virtual viewpoint of the occupant in the vertical direction by adding a value corresponding to the amount of change in the pitch angle to a position in the vertical direction corresponding to the reference angle, wherein the image conversion unit is configured to generate the display image to be displayed in the display region of the display unit based on the captured image and the position of the virtual viewpoint set by the virtual viewpoint setting unit, and wherein the display image is an image as if looking outside the vehicle through the display unit from the virtual viewpoint and the display image is the image of the captured image viewed from the virtual viewpoint, wherein the image conversion unit is configured to:

project the captured image onto a ground model set in a vehicle coordinate system to generate a ground model image; and convert the generated ground model image into the display image viewed from the position of the virtual viewpoint set by the virtual viewpoint setting unit.

2. The display control device according to claim 1, further comprising:

a viewpoint position acquisition unit for acquiring information related to the position of an eye of the occupant, wherein the virtual viewpoint setting unit sets the virtual viewpoint to a position corresponding to the position of the eye of the occupant when the angle of the face of the occupant is the reference angle, and when the angle of the face of the occupant is not the reference angle, moves the position of the virtual viewpoint to a position corresponding to the amount of change, which is calculated by subtracting the angle of the face of the occupant acquired by the occupant information acquisition unit from the stored reference angle, from the position of the eye of the occupant.

3. The display control device according to claim 1, wherein the image conversion unit is configured to execute a first conversion process for converting coordinates of the captured image from an image coordinate system of the captured image to coordinates of a vehicle coordinate system, which is a coordinate system of the vehicle, and a second conversion process for converting the coordinates of the vehicle coordinate system to a display coordinate system, which is a coordinate system of the display unit.

4. A display control method for a vehicle, the display control method being executed by a control unit of a display control device provided in the vehicle and the display control being configured to change a display image displayed on a display unit by a change in an angle of a face of a occupant of the vehicle, the display control method comprising:

an occupant monitoring step for outputting a yaw angle and a pitch angle indicating a direction in which the face of the occupant of the vehicle is facing in a horizontal direction and a vertical direction as information related to the angle of the face, wherein the yaw angle is the angle of the face of the occupant in the horizontal direction and the pitch angle is the angle of the face of the occupant in the vertical direction;

an occupant information acquisition step for acquiring information related to the angle of the face of the occupant of the vehicle;

an image acquisition step for acquiring a captured image in which a periphery of the vehicle is captured;

an image conversion step for converting the captured image in which the periphery of the vehicle is captured by the image acquisition step to the display image;

a virtual viewpoint setting step for setting the position of a virtual viewpoint based on an amount of change in the angle of the face of the occupant, the virtual viewpoint corresponding to a center of projection when a display region of the display unit is set to a projection surface;

a display processing step for performing control to display the display image on the display unit; and a storing step for storing a reference angle in which the angle of the face of the occupant is a prescribed angle, wherein the occupant information acquisition step comprises:

acquiring the angle of the face after the direction of the face has changed output in the occupant monitoring step, and acquire the reference angle stored in the storage step;

calculating an amount of change in the yaw angle by subtracting the yaw angle as the reference angle from the yaw angle as the angle of the face after movement; and calculating an amount of change in the pitch angle by subtracting the pitch angle as the reference angle from the pitch angle as the angle of the face after movement, wherein the virtual viewpoint setting step comprises:

setting the position of the virtual viewpoint of the occupant in the horizontal direction by adding a value corresponding to the amount of change in the yaw angle to a position in the horizontal direction corresponding to the reference angle; and setting the position of the virtual viewpoint of the occupant in the vertical direction by adding a value corresponding to the amount of change in the pitch angle to a position in the vertical direction corresponding to the reference angle, wherein the image conversion step generates the display image to be displayed in the display region of the display unit based on the captured image and the position of the virtual viewpoint set by the virtual viewpoint setting step, and wherein the display image is an image as if looking outside the vehicle through the display unit from the virtual viewpoint and the display image is the image of the captured image viewed from the virtual viewpoint, wherein the image conversion step comprises:

projecting the captured image onto a ground model set in a vehicle coordinate system to generate a ground model image; and converting the generated ground model image into the display image viewed from the position of the virtual viewpoint set by the virtual viewpoint setting step.

5. The method according to claim 4, further comprising:

a viewpoint position acquisition step for acquiring information related to the position of an eye of the occupant, wherein the virtual viewpoint setting step sets the virtual viewpoint to a position corresponding to the position of the eye of the occupant when the angle of the face of the occupant is the reference angle, and when the angle of the face of the occupant is not the reference angle, moves the position of the virtual viewpoint to a position corresponding to the amount of change, which is calculated by subtracting the angle of the face of the occupant acquired by the occupant information acquisition step from the stored reference angle, from the position of the eye of the occupant.

6. The method according to claim 4, wherein the image conversion step executes a first conversion process for converting coordinates of the captured image from an image coordinate system of the captured image to coordinates of a vehicle coordinate system, which is a coordinate system of the vehicle, and a second conversion process for converting the coordinates of the vehicle coordinate system to a display coordinate system, which is a coordinate system of the display unit.

7. A display control device for a vehicle, the display control device being configured to change a display image displayed on a display unit by a change in an angle of a face of an occupant of the vehicle and comprising:

an occupant information acquisition unit for acquiring information related to the angle of the face of the occupant of the vehicle;

an image acquisition unit for acquiring a captured image in which a periphery of the vehicle is captured;

an image conversion unit for converting the captured image in which the periphery of the vehicle is captured by the image acquisition unit to the display image;

a virtual viewpoint setting unit for setting the position of a virtual viewpoint based on an amount of change in the angle of the face of the occupant, the virtual viewpoint corresponding to a center of projection when a display region of the display unit is set to a projection surface;

a display processing unit for performing control to display the display image on the display unit; and a storage unit for storing a reference angle in which the angle of the face of the occupant is a prescribed angle, wherein the virtual viewpoint setting unit is configured to set the position of the virtual viewpoint based on an amount of change, which is calculated by subtracting the angle of the face of the occupant acquired by the occupant information acquisition unit from the reference angle stored in the storage unit, wherein the image conversion unit is configured to generate the display image to be displayed in the display region of the display unit based on the captured image and the position of the virtual viewpoint set by the virtual viewpoint setting unit, wherein the image conversion unit is also configured to:

project the captured image onto a ground model set in a vehicle coordinate system to generate a ground model image; and convert the generated ground model image into the display image viewed from the position of the virtual viewpoint set by the virtual viewpoint setting unit, and wherein the display image is an image as if looking outside the vehicle through the display unit from the virtual viewpoint and the display image is the image of the captured image viewed from the virtual viewpoint.

8. The display control device according to claim 7, further comprising:

a viewpoint position acquisition unit for acquiring information related to the position of an eye of the occupant, wherein the virtual viewpoint setting unit sets the virtual viewpoint to a position corresponding to the position of the eye of the occupant when the angle of the face of the occupant is the reference angle, and when the angle of the face of the occupant is not the reference angle, moves the position of the virtual viewpoint to a position corresponding to the amount of change, which is calculated by subtracting the angle of the face of the occupant acquired by the occupant information acquisition unit from the stored reference angle, from the position of the eye of the occupant.

* * * * *